United States Patent
Mersnik et al.

(10) Patent No.: US 10,365,637 B2
(45) Date of Patent: Jul. 30, 2019

(54) WORKPIECE CARRIER WITH A CODE ELEMENT FOR A PRODUCTION UNIT

(71) Applicant: STIWA Holding GmbH, Attnang-Puccheim (AT)

(72) Inventors: Christian Mersnik, Attnang-Puchheim (AT); Michael Pauditz, Schwanenstadt (AT)

(73) Assignee: STIWA Holding GmbH, Attnang-Puchheim (AT)

( * ) Notice: Subject to any disclaimer, the term of this patent is extended or adjusted under 35 U.S.C. 154(b) by 0 days.

(21) Appl. No.: 15/744,212

(22) PCT Filed: Jul. 22, 2016

(86) PCT No.: PCT/AT2016/060014
§ 371 (c)(1),
(2) Date: Feb. 12, 2018

(87) PCT Pub. No.: WO2017/015686
PCT Pub. Date: Feb. 2, 2017

(65) Prior Publication Data
US 2018/0203435 A1 Jul. 19, 2018

(30) Foreign Application Priority Data
Jul. 24, 2015 (AT) .............................. A 50657/2015

(51) Int. Cl.
*G06F 7/00* (2006.01)
*G05B 19/418* (2006.01)

(52) U.S. Cl.
CPC .. *G05B 19/4183* (2013.01); *B65G 2201/0258* (2013.01); *B65G 2203/0266* (2013.01);
(Continued)

(58) Field of Classification Search
None
See application file for complete search history.

(56) References Cited

U.S. PATENT DOCUMENTS

| 4,591,991 A | 5/1986 | Sticht |
| 5,168,477 A | 12/1992 | Schenato et al. |

(Continued)

FOREIGN PATENT DOCUMENTS

| AT | 288 112 B | 2/1971 |
| AT | 390 424 B | 5/1990 |

(Continued)

OTHER PUBLICATIONS

International Search Report of PCT/AT2016/060014, dated Nov. 24, 2016.

*Primary Examiner* — Yolanda R Cumbess
(74) *Attorney, Agent, or Firm* — Collard & Roe, P.C.

(57) ABSTRACT

The invention concerns a workpiece carrier (4) for a production unit (1) with at least one conveying section (2). The workpiece carrier (4) comprises a workpiece carrier body (13), a workpiece receptacle (16) arranged on the workpiece carrier body (13), a guide device (14) which is arranged on the workpiece carrier body (13) by means of which the workpiece carrier (4) can be received and displaced in the production unit (1), in particular in the conveying section (2), and a code element (20) which is arranged on the workpiece carrier body (13) which is designed to identify the workpiece carrier (4) by means of a detection means (11) arranged in the production unit (1). For identification, the code element (20) has inhomogeneous material properties in its longitudinal orientation. During a relative movement of the code element (20) in the longitudinal orientation (23) relative to the detection means (11), the inhomogeneous material properties of the code element (20) can be detected by the detection means (11) and the workpiece carrier (4) can be identified.

15 Claims, 3 Drawing Sheets

Figure 1:
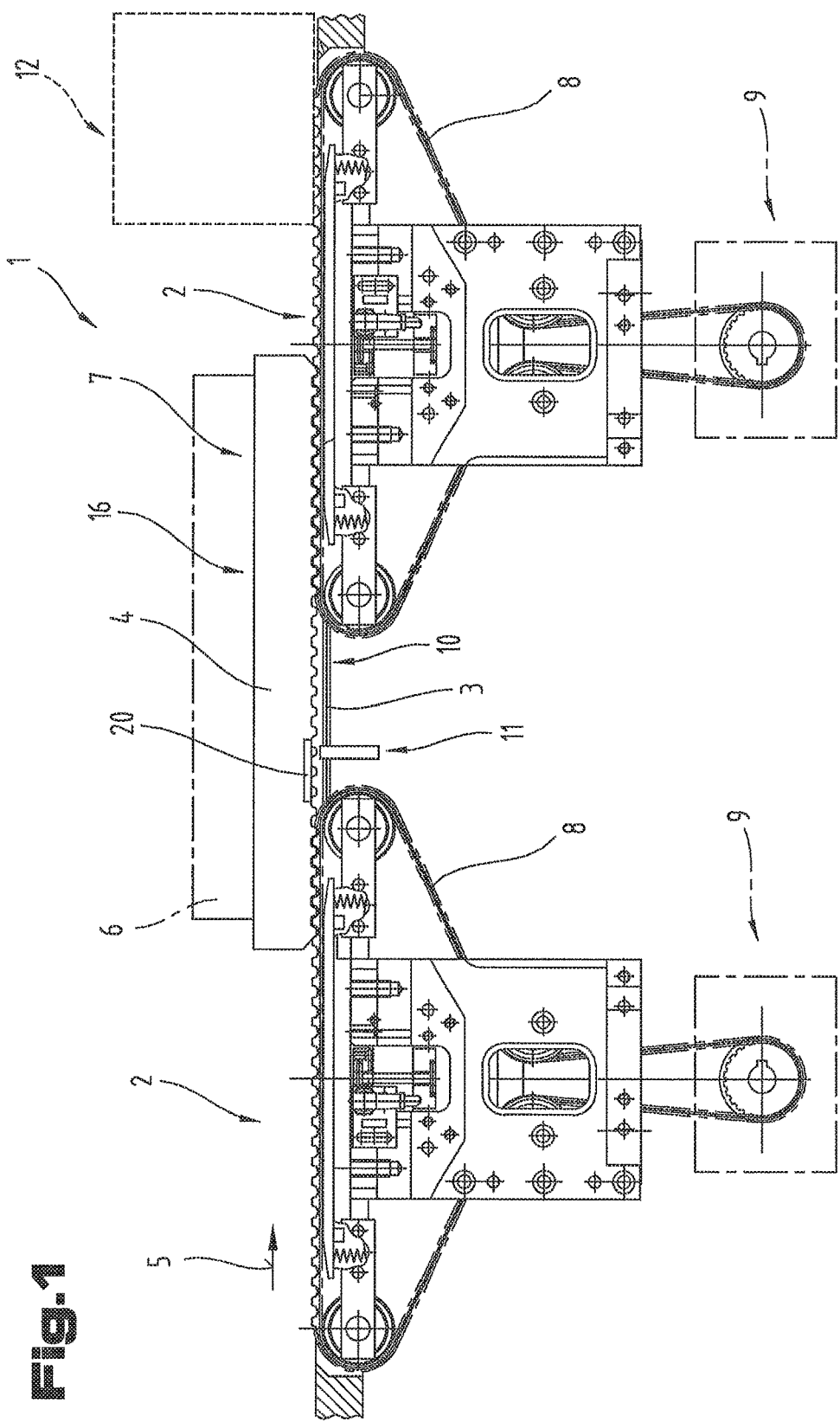

(52) U.S. Cl.
CPC ........... *B65G 2203/0283* (2013.01); *B65G 2203/043* (2013.01); *G05B 2219/31312* (2013.01); *Y02P 90/10* (2015.11); *Y02P 90/265* (2015.11)

(56) References Cited

U.S. PATENT DOCUMENTS

| | | | |
|---|---|---|---|
| 6,616,041 B1* | 9/2003 | Corby, Jr. | G06K 1/126 |
| | | | 235/462.01 |
| 6,782,750 B1 | 8/2004 | Melandso et al. | |
| 7,014,033 B2* | 3/2006 | Sticht | B65G 35/06 |
| | | | 198/345.3 |
| 8,534,446 B2* | 9/2013 | Stadler | B65G 47/24 |
| | | | 198/345.1 |
| 2010/0182150 A1* | 7/2010 | Edelstain | B65D 19/38 |
| | | | 340/572.8 |
| 2011/0095087 A1* | 4/2011 | Master | B65D 19/38 |
| | | | 235/385 |
| 2011/0267043 A1 | 11/2011 | Dolsak | |
| 2013/0064937 A1 | 3/2013 | Jarisch et al. | |
| 2015/0028098 A1* | 1/2015 | Kleinikkink | G06Q 90/00 |
| | | | 235/376 |

FOREIGN PATENT DOCUMENTS

| | | |
|---|---|---|
| AT | 413 505 B | 3/2006 |
| CH | 699 992 A2 | 5/2010 |
| CN | 1478687 A | 3/2004 |
| CN | 101055615 A | 10/2007 |
| CN | 102301205 A | 12/2011 |
| DE | 2601823 A1 | 7/1977 |
| DE | 2616436 A1 | 10/1977 |
| DE | 2943622 A1 | 5/1981 |
| DE | 3872429 T2 | 2/1993 |
| DE | 4207798 A1 | 2/1993 |
| DE | 10 2008 046 740 A1 | 3/2010 |
| DE | 10 2012 006 950 A1 | 10/2013 |
| EP | 0 460 733 A1 | 12/1991 |
| EP | 2 560 861 B1 | 2/2013 |
| GB | 2 062 917 A | 5/1981 |
| JP | H06-13453 A | 1/1994 |
| WO | 2010/086585 A1 | 8/2010 |

* cited by examiner

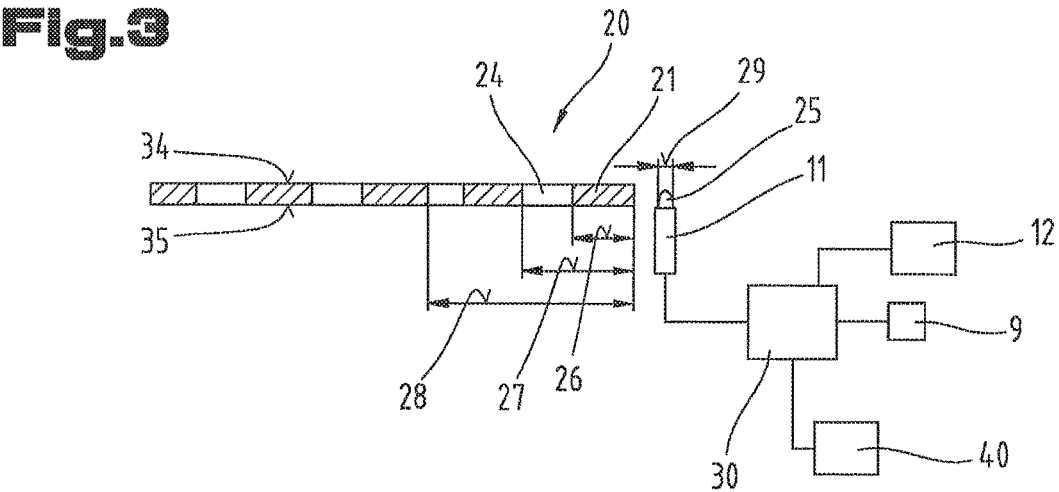
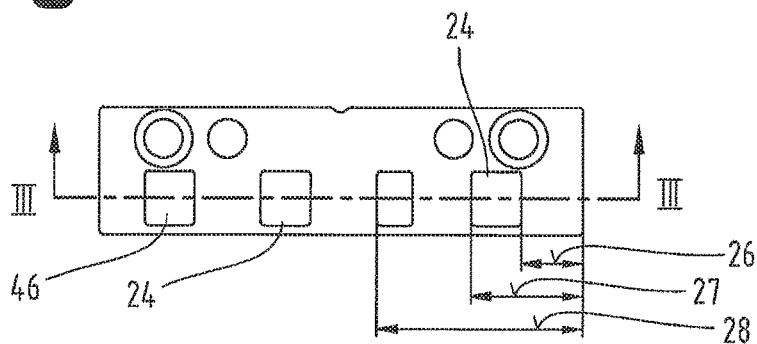
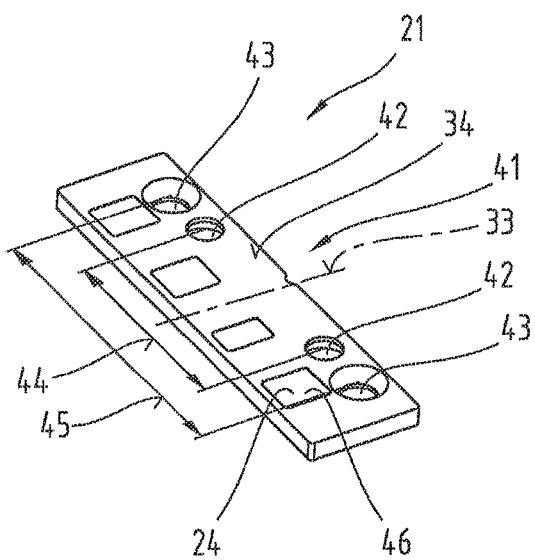 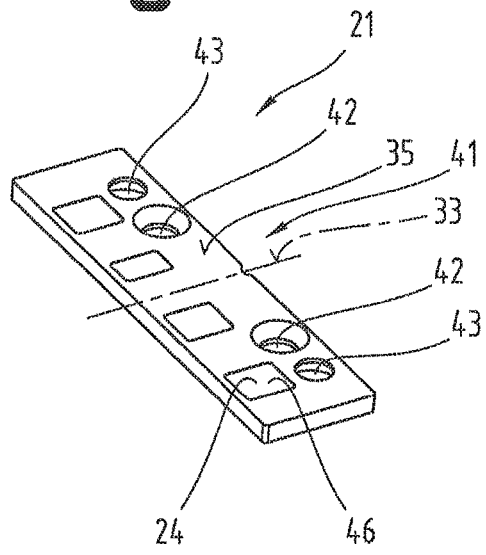

WORKPIECE CARRIER WITH A CODE ELEMENT FOR A PRODUCTION UNIT

CROSS REFERENCE TO RELATED APPLICATIONS

This application is the National Stage of PCT/AT2016/060014 filed on Jul. 22, 2016, which claims priority under 35 U.S.C. § 119 of Austrian Application No. A 50657/2015 filed on Jul. 24, 2015, the disclosure of which is incorporated by reference. The international application under PCT article 21(2) was not published in English.

The invention relates to a workpiece carrier for a production unit with at least one conveying section, as well as the production unit and a method for identifying a workpiece carrier.

EP2560861 A1 discloses a conveying device with a component carrier trolley on which a RFID chip is arranged. The RFID chip stores information about the component carrier trolley.

The conveying device with the component carrier trolley disclosed in EP2560861 A1 has the disadvantage that, in order to read out information about the component carrier trolley, it must be stopped or at least slowed down to read out the RFID chip.

AT413505 B discloses a general design of a generic conveying device.

The present invention aims to create an improved conveying device, improving the identification of component carrier trolleys.

This aim is achieved by the measures in accordance with the invention.

The invention specifies a workpiece carrier for a production unit with at least one conveying section. The workpiece carrier comprises a workpiece carrier body, a workpiece receptacle arranged on the workpiece carrier body, a guide device which is arranged on the workpiece carrier body for use in receiving and displacing the workpiece carrier in the production unit, or more specifically in the conveying section of the production unit, and a code element which is arranged on the workpiece carrier body which is designed to identify the workpiece carrier by the code element using a detection means arranged in the production unit. The code element has material properties which are inhomogeneous in a longitudinal direction, such that during a relative movement of the code element in a longitudinal direction relative to the detection means, the inhomogeneous material properties can be detected by the detection means and the workpiece carrier can be identified.

The advantage of the invented design is that the inhomogeneous material properties allow the code element to be read out while the workpiece carrier passes by a sensor. This way the workpiece carrier can be identified without having to be stopped. This brings with it a considerable reduction of transport times, improving the efficiency of the production unit.

It can further be useful if the code element is designed as a code plate attached to the workpiece carrier body. It is advantageous for the code plate to be manufactured in a separate manufacturing process or method. This way the code plate can be produced with the highest and most satisfactory possible precision to achieve adequate resolution for identifying the code plate, whereby the workpiece carrier, or more specifically the workpiece carrier body, can be manufactured with a lower precision tolerance and thus the manufacturing costs of the workpiece carrier body can be reduced. In addition, if the workpiece carrier body breaks or wears out, it can be replaced and the already existing code plate can be used to identify the workpiece carrier body. The code plate can be manufactured by laser cutting.

It can further be provided that the code element be formed of a metallic material, for example austenitic steel. The advantage of using austenitic steel, for example, is that austenitic steel can be detected by, for example, an inductive proximity sensor, and the code element and workpiece carrier can be identified in this way. Such a steel could, for example, be a NiRo steel with material number 1.4301.

It can further be provided for the code element to have openings constituting the inhomogeneous material properties. Such a code element, for example a code plate, can be easily read out in a moving system using the openings, allowing the workpiece carrier to be identified. The openings in the code plate can represent the detection status zero in a great variety of sensors such as optical sensors or inductive proximity sensors and the solid material of the code plate can represent the detection status one.

Also advantageous is a form in which it can be provided that the openings are filled in by a filling material such as synthetic resin. This prevents unwanted materials such as dirt from getting into the openings. This can improve the quality of the information read out by minimising potential sources of error. In addition, it is easy to apply synthetic resin to the openings and it is very mechanically robust in its hardened state.

In a further development, it is possible for a workpiece carrier body to have arranged on it at least four code elements for use in determining the orientation of the workpiece carrier body. In this way both the identification and clear assignment of the workpiece carrier as well as the current orientation of the workpiece carrier can be determined. This information is needed, for example, if a workpiece carrier is used that can be displaced or transported within the production unit while having various orientations.

It can further be useful for eight code elements in the form of code plates to be arranged on the workpiece carrier body, with all code plates designed to be identical. The advantage here is that all code plates arranged on the workpiece carrier have the same shape and can be manufactured together. The code plates can be used to identify the workpiece carrier clearly and can additionally be used to determine its orientation.

It can further be provided that the code elements be arranged on the underside of the workpiece carrier body. The advantage here is, for example, that the code plates are protected by the workpiece carrier. In addition, a sensor arranged on the production unit can easily detect the code plates when they are positioned as described.

A special form makes it possible to design the detection means in the form of an inductive proximity sensor. The advantage here is that an inductive proximity sensor has a low error rate and thus the accuracy of detection is very high.

In a method for identifying a workpiece carrier in a production unit, it is provided that the method comprises the following method steps:

Movement of the workpiece carrier in a conveying section of the production unit, wherein the workpiece carrier has a code element which is designed to identify the workpiece carrier by the code element using a detection means arranged in the production unit and that for this identification has inhomogeneous material properties in a longitudinal orientation;

Passage of the workpiece carrier by the detection means, wherein in a relative movement of the code element relative to the detection means the inhomogeneous material properties of the code element are detected by the detection means;

Analysis of the signal output by the detection means and thus identification of the workpiece carrier.

The advantage of the invented method is that the inhomogeneous material properties allow the code element to be read out while the workpiece carrier passes by a sensor. This way the workpiece carrier can be identified without having to be stopped. This brings with it a considerable reduction of transport times, improving the efficiency of the production unit.

For example, it can be advantageous if the detection means takes the form of an inductive proximity sensor and the code element is formed of a metallic material, for example, a ferromagnetic material, and has openings constituting the inhomogeneous material properties, wherein when the workpiece carrier passes by the detection means the latter detects these openings. These measures make it possible to identify the workpiece carrier during the motion, where the sensor arrangement and/or the code element can be constructed as simply as possible and the error rate of identification of the workpiece carrier can therefore be kept low.

In addition, it can be provided that the code elements be differentiated by different position and size of the openings and the workpiece carrier can be clearly identified in this way. In other words, the code elements can be identified based on their varying geometry and thus clearly assigned.

In a further development, it is possible for distances from rising flank to rising flank and/or from falling flank to falling flank to be detected on the code elements. This measures makes it possible for any potentially occurring measurement error in the measurement between rising flank and falling flank to be avoided. This can maintain measurement accuracy and detection accuracy at a high level.

It can further be useful for eight code elements to be arranged on a workpiece carrier, designed in the form of code plates, such that when the workpiece carrier passes by the detection means two code plates are always detected and the orientation of the workpiece carrier is determined from the orientation of the code plates. The arrangement of eight different code elements, especially of code plates on the workpiece carrier, makes it possible not only for the workpiece carrier to be identified but also for the orientation of the workpiece carrier to be identified when the workpiece carrier passes by the detection means. The use of eight code plates makes it possible for the code plates which are arranged on a workpiece carrier to have the same form and the orientation of the workpiece carrier to be detected from the placement of two code plates relative to each other.

In addition, it can be provided, based on the identification of the workpiece carrier, for the relevant data of the identified workpiece carrier, such as information about the workpieces to be processed, to be downloaded by a server via a network. It is advantageous that the relevant data of the identified workpiece carrier is centrally administrated. In addition, in this way a great variety of information about the workpiece carriers can be recorded and modified on the server.

It can further be provided that a control unit specify or determine the speed of the workpiece carrier when passing the detection means and, based on the timing of the incoming signal from the detection means, that the geometric configuration of the code element be determined and the workpiece identified. The code elements can be clearly identified by its form. The timing of the signal of the detection means and knowledge of the current speed of the workpiece carrier allows the form of the code element to be computed. The determined form of the code element can be compared to a comparison database. In this way, the code element and therefore the workpiece carrier can be clearly assigned. Alternatively to the comparison database, it can also be provided for the workpiece carrier to be identified by predefined computations using the geometry of the code element that compute the ID of the workpiece carrier.

In a special form, it is possible for the detection means to detect the current position of the workpiece carrier. This detection is, for example, achieved by clearly specifying the location of the code element on the workpiece carrier and allowing the current position of the workpiece carrier to be detected by the detection means independently of identification of the code element.

To facilitate better understanding of the invention, it will be explained in detail using the figures below.

Extremely simplified, schematic depictions show the following:

FIG. 1 Schematic depiction of a side view of the production unit.

Figure 2:
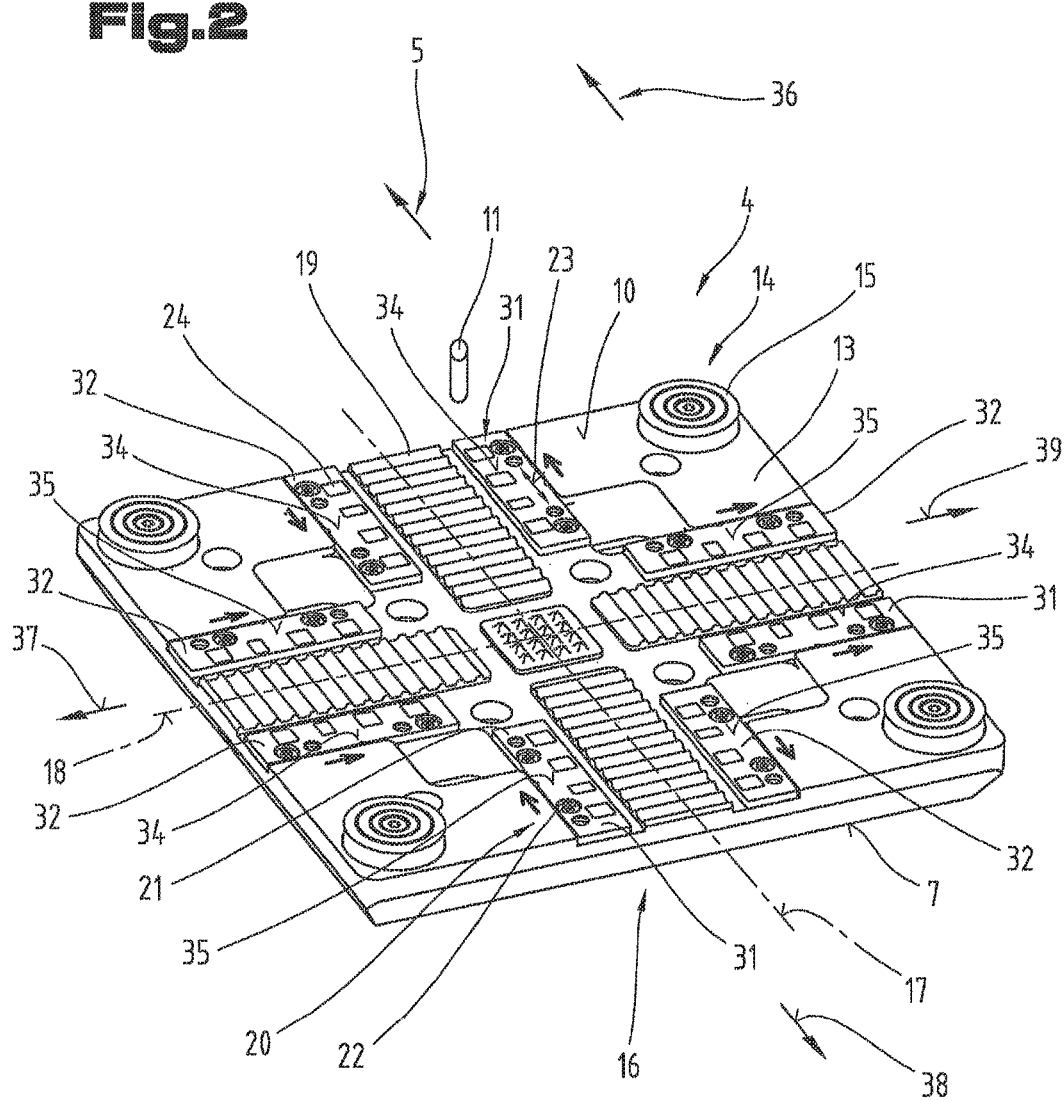

FIG. 2 The workpiece carrier in a perspective view at an angle from below;

FIG. 3 A section view of the code plate following section from FIG. 4;

FIG. 4 A top view of the code plate;

FIG. 5 A perspective view of the code plate in a first position;

FIG. 6 A perspective view of the code plate in a second position;

In introduction, let it be noted that in the variously described embodiments, identical parts are provided with identical reference signs or identical part names, and that the disclosures contained in the description as a whole can be carried over analogously to identical parts with identical reference signs or identical part names. Likewise, positional information selected in the description, e.g. above, below, on the side, etc. refer to the directly described and depicted figure and if the position is changed, this positional information carries over analogously to the new position.

FIG. 1 shows a schematic depiction of a production unit 1 with two conveying sections 2. The conveying sections 2 comprise a guide structure 3 for use in guiding or holding a workpiece carrier 4. Conveying section 2 can be used to guide a workpiece carrier 4 such that it is displaced in the displacement direction 5.

The workpiece carrier 4 serves, for example, to receive a workpiece 6 to be processed. For example, one or more fastening or clamping devices can be provided on the top side 7 of the workpiece carrier 4 for use in attaching the workpiece 6 to the workpiece carrier 4. In another embodiment variation, it can be provided for the workpiece 6 to be placed loosely on the workpiece carrier 4, with the workpiece carrier 4 having corresponding workpiece receptacles 16 for the workpiece 6.

As can also be seen from FIG. 1, it can be provided that the conveying sections 2 each have one catch element 8 actuated by a drive unit 9. The catch element 8 may, for example, take the form of a toothed belt which can mesh with the underside 10 of the workpiece carrier 4. The drive unit 9 can, for example, be formed by a servo motor with a drive pinion arranged on it. This structure allows the workpiece carrier 4 to be moved in the displacement direction 5.

The guide structure 3 can extend along the whole length of the production unit 1, with the workpiece carrier 4 freely displaceable in the guide structure 3. It is only the catch element 8 that guides the workpiece carrier 4 in its position along the guide structure 3. The workpiece carrier 4 is guided by various conveying sections 2 on its transport path, wherein the workpiece carrier 4 can mesh with two catch elements 8 of the two different conveying sections 2 at the transition between two conveying sections 2.

In addition, one or more detection means 11 can be provided at the production unit 1 for use in identifying the workpiece carrier 4 or for use in determining the position and orientation of the workpiece carrier. The detection means 11 and/or its function will be described in more detail below.

It can further be provided for a processing station 12 to be provided inside the production unit 1 in which the workpiece 6 arranged on the workpiece carrier 4 is processed. The processing station 12 can, for example, be designed for mechanical processing of workpieces.

The detection means 11 can be arranged at any place in the production unit 1. For example, it can be provided for the detection means 11 to be placed between two conveying sections 2. It can further be provided for the detection means 11 to be arranged in the region of a conveying section 2. For example, it can be provided for the detection means 11 to be arranged just before a processing station 12 such that the workpiece carrier 4 can be detected shortly before it drives into the processing station 12.

FIG. 2 shows a perspective view of a workpiece carrier 4. The view is specifically arranged so that an underside 10 of the workpiece carrier 4 is visible. As seen in FIG. 2, it can be provided for the workpiece carrier 4 to comprise a workpiece carrier body 13 on which a variety of elements can be arranged. For example, a guide device 14 can be arranged on the underside 10 of the workpiece carrier body 13 that matches the guide structure 3 of the production unit 1 and thereby guides the workpiece carrier 4.

The guide device 14 can, for example, be formed of four guide rollers 15. The guide rollers 15 can have a contouring around their circumference that matches a corresponding counter-contouring of the guide structure 3. For example, it can be provided for the guide rollers 15 to have a V-shaped indentation and for the guide structure 3 to have a corresponding complementary V-shaped embossment. In general, however, any kind of contour is possible that can form the guide structure 3.

On the top side 7 of the workpiece carrier 4, for example on the workpiece carrier body 13, a workpiece receptacle 16 can be arranged to receive the workpiece 6. The workpiece receptacle 16 is not visible in the depiction in FIG. 2.

As can further be seen from FIG. 2, it can be provided for the workpiece carrier body 13 to be formed largely symmetrically in reference to a first symmetry plane 17 or in reference to a second symmetry plane 18. For example, it can be provided for the workpiece carrier body 13 to have a square basis.

It can further be provided for gearing 19 to be arranged in both orientation directions in the middle of the workpiece carrier body 13. The gearing 19 can be formed to be complementary to the catch element 8, especially toothed belt, in order to interlock with it and thereby displace the workpiece carrier 4.

For example, it is provided for at least one code element 20 to be arranged on the workpiece carrier 4 that serves to identify the workpiece carrier 4. The code element 20 can be designed in the form of a code plate 21 that can be attached to a workpiece carrier body 13. For example, it can be provided for the code plate 21 to be attached to the workpiece carrier body 13 by fastening means 22. The fastening means 22 can be formed of screws, for example countersunk screws.

As is visible from FIG. 2, it can be provided for several code elements 20, especially code plates 21, to be arranged on the workpiece carrier body 13. In this way the orientation of the workpiece carrier 4 can be determined.

For example, it can be provided for two code plates 21 each to be placed on the workpiece carrier 4 on both sides of the gearing 19.

To identify the workpiece carrier 4, the detection means 11 is arranged in the production unit 1 in such a way that when the workpiece carrier 4 is displaced in the displacement direction 5 the code elements are carried past the detection means 11. The code elements 20 have inhomogeneous material properties in a longitudinal direction 23 that is parallel to the displacement direction 5 and parallel to the first symmetry plane 17 and/or parallel to the second symmetry plane 18. For example, it can be provided for the inhomogeneous material properties to be formed by the code element 20 or code plate 21 having openings 24. The openings 24 can, for example, take the form of cuttings with a rectangular cross-section.

The detection means 11 can, for example, take the form of an inductive proximity sensor, wherein the sensor can output the switching status of either 1 or 0. The switching status 1 is output when a metallic material, especially austenitic steel, or a ferromagnetic material is within a certain distance of the inductive sensor. If the austenitic steel or ferromagnetic material is removed from the detection range of the inductive sensor, the information status 0 is output. Any other material that the inductive sensor can detect can be used in place of the austenitic steel or ferromagnetic material.

FIG. 3 shows the code plate 21 in a section view along its longitudinal orientation 23, according to the section III-III in FIG. 4. The openings 24 are, for example, easy to see in FIG. 3.

The exact process for identifying the code plate 12 and/or the workpiece carrier 4 is described below using FIGS. 2 and 3.

In the initial state, the workpiece carrier 4 is located at any position within the conveying section 2. If the workpiece carrier 4 is now moved in the displacement direction 5 to the processing station 12, the code element 20 of the workpiece carrier 4, or more specifically the code plate 21, approaches the detection means 11. The detection means 11 still has the information status 0. If the workpiece carrier 4 is now displaced towards the detection means 11 enough that the code element 20 moves into the detection range 25 of the detection means 11, the information status of the detections means 11 changes from 0 to 1. The switch from information status 0 to information status 1 is called the rising flank. The information status 1 now remains until the solid material of the code element 20 leaves the detection range 25 of the detection means 11 and the detection range 25 is located within an opening 24 and therefore does not detect solid material. Upon this transition, the information status of the detection means 11 jumps from 1 to 0. This change in the information status is called the falling flank. If the workpiece carrier 4 is displaced further in the displacement direction 5, solid material once again comes within the detection range 25 of the detection means 11 because of the limited extension of the opening 24 and the information status jumps back to 1.

If the current speed of the workpiece carrier 4 is known, the time difference between the jumps between the information statuses 0 and 1 can be used to determine the size and position of the openings 24 and the formation of the openings 24 can be used to identify the workpiece carrier 4. For example, as can be seen in FIG. 3, a first length 26 between the first rising flank and the first falling flank can be determined. In addition, a second length 27 between the first rising flank and a second rising flank can be determined. In addition, a third length 28 between the first rising flank and third rising flank can be determined. This applies analogously to the other distances between the remaining openings 24. The detection of the distances from falling flank to falling flank is analogous to this.

As can be seen in FIG. 3, the detection range 25 of the detection means 11 has a certain thickness 29 such that a length between rising flank and falling flank is detected imprecisely in consequence of the thickness 29. It can further be seen that the thickness 29 of the detection range 25 also depends on the distance between the code plate 21 and the detection means 11.

For the reasons above, it has proven advantageous if only the lengths between two rising flanks are determined as this does not errors to arise because of the detection range 25 of the detection means 11.

The second length 27, the third length 28, etc. can now be determined using the speed of the workpiece carrier 4, which a control unit 30 specifies for the drive unit 9 or which can, if needed, be detected by a sensor of the control unit 30 as well as using the determined time interval between the rising flanks. Along with moving the workpiece carrier 4 at a constant speed, it is also possible to accelerate or decelerate the workpiece carrier 4 while it passes by the detection means 11. Acceleration or deceleration are also taken into account in the calculation when determining the form of the code plate 21.

A specific template or form of a code plate 21 is assigned to a specific workpiece carrier 4. By comparing the form of the code plate 21 to a database, the workpiece carrier 4 can be identified.

The first rising flank at the start of the code plate 21 also allows the position of the workpiece carrier 4 to be determined and compared to the target position specified by the control unit 30. This is possible because the different code plates 21 all have the same outside contour and the position of the code plates 21 on the workpiece carrier 4 is also specified.

As can be seen in FIG. 2, two code plates 21 can be arranged on the workpiece carrier 4 directly after one another in the displacement direction 5, with these being called the first code plate 31 and the second code plate 32 for better understanding. When the workpiece carrier 4 is driven, the detection means 11 detects first the first code plate 31 and then the second code plate 32. It can be specified for one first code plate 31 and one second code plate 32 to be provided in all four directions, allowing the orientation of the workpiece carrier 4 to be determined.

For example, it is conceivable for the first code plate 31 and the second code plate 32 and/or all code plates 21 attached to a single workpiece carrier 4 to have the same geometry or shape. To be able to determine the orientation of the workpiece carrier 4, it is necessary for the code plates 21 to be designed asymmetrically in reference to the central axis 33.

A top side 34 and an underside 35 of the code plates 21 can be distinguished. As seen in FIG. 2, the four orientation directions of the workpiece carrier 4 can be determined in this way.

In a first orientation direction 36, the first code plate 31 has the top side 34 facing the sensor 11 and the second code plate 32 has the underside 35 facing the sensor 11.

In a second orientation direction 37, the first code plate 31 has the underside 35 facing the sensor 11 and the second code plate 32 has the underside 35 facing the sensor 11.

In a third orientation direction 38, the first code plate 31 has the underside 35 facing the sensor 11 and the second code plate 32 has the top side 34 facing the sensor 11.

In a fourth orientation direction 39, the first code plate 31 has the top side 34 facing the sensor 11 and the second code plate 32 has the top side 34 facing the sensor 11.

With the described arrangement of the code plates 31 on the workpiece carrier 4, eight code plates 31 that all have the same form can be used to determine the orientation of the workpiece carrier 4.

The information in the identification of the workpiece carrier 4 and/or the position and orientation of the workpiece carrier 4 can be compared to the code plates 31 and/or to the workpiece carrier 4 using comparison data stored on a storage unit, for example a central server 40. In this way the workpiece carrier 4 can be unambiguously identified and its orientation determined. The information about the identified workpiece carrier 4 can be transmitted to the control unit 30 and processed and/or forwarded by it to the processing station 12.

Because the data about the workpiece carriers 4 is centrally stored, it is possible for it to be adjusted or for additional information to be read in during operation of the production unit 1. This has the advantage that the workpiece carriers 4 do not need to be stopped to import additional information.

FIG. 5 shows the code plate 21 in a perspective view in a first position, where the top side 34 of the code plate 21 is visible. FIG. 5 uses the same reference signs and part names for the same parts as were used in the preceding FIGS. 1 and 4. To avoid unnecessary repetition, please refer to the detailed description in the above FIGS. 1 to 4.

FIG. 6 shows the code plate 21 in a perspective view in a second position, where the underside 35 of the code plate 21 is visible. FIG. 6 uses the same reference signs and part names for the same parts as were used in the preceding FIGS. 1 and 5. To avoid unnecessary repetition, please refer to the detailed description in the above FIGS. 1 to 5.

As can be seen in FIGS. 5 and 6, it can be provided for the code plate 21 to have a groove 41 that acts as a orientation aid for the assembly of the code plate 21 on the workpiece carrier 4.

It can further be provided for each code plate 21 to be attached to the workpiece carrier body 13 by two fastening means 22. The code plate 21 can have two inner clearance holes 42 and two outer clearance holes 43, where the inner clearance holes 42 are placed at a distance a 44 and the outer clearance holes 43 are placed at a distance b 45 from each other.

The outer clearance holes 43 preferably have a depression on the top side 34 of the code plates 21 and the inner clearance holes 42 preferably have a depression on the underside 35 of the code plates 21.

As seen in FIG. 2, the threaded holes for receiving the fastening means 22 in the workpiece carrier body 13 are placed at either a distance a 44 or a distance b 45 so that the fastening position of the code plate on the workpiece carrier body 13 is specified. In this way incorrect assembly of the code plates 21 on the workpiece carrier body 13 can be prevented. This also clearly determines the orientation of the workpiece carrier 4.

It can further be provided for the openings 24 in the code plates 21 to be filled with a filling material 46. Such a filling material can, for example, take the form of a synthetic resin or the like. The filling material 46 acts to prevent foreign bodies such as dirt from getting into the openings 24. This prevents the signal output by the detection means 11 from being corrupted.

Analogously to the described example embodiment, it is conceivable for the detection means 11 to be designed as, for example, an optical sensor and the code element 20 to have a reflecting surface if needed. It is also conceivable for the detection means 11 to be designed as a Hall sensor. Other sensors can also be used for the detection means 11, with the detection means 11 detecting a material inhomogeneity in the code element.

Furthermore, individual characteristics or combinations of characteristics from the depicted and described various example embodiments can constitute independent inventive or invented solutions.

The aim underlying the independent invented solutions can be taken from the description.

All information regarding ranges of values in this description should be understood to mean that these include any and all partial ranges, e.g. the statement 1 to 10 should be understood to mean that all partial ranges starting from the lower threshold 1 and the upper threshold 10 are included, i.e. all partial ranges begin with a lower threshold of 1 or larger and with an upper threshold of 10 or less, e.g. 1 to 1.7 or 3.2 to 8.1 or 5.5 to 10.

Above all, the individual embodiments shown in FIGS. 1, 2, 3, 4, 5, 6 can form the subject of independent invented solutions. The relevant aims according to the invention and solutions can be found in the detailed descriptions of these figures.

As a matter of form, let it be noted that, to facilitate a better understanding of the design of the workpiece carrier 4, it and its parts and components have been portrayed largely to scale in FIGS. 2, 3, 4, 5, and 6. The production unit 1 was portrayed only schematically and therefore not to scale and/or enlarged and/or scaled-down in FIG. 1.

| List of reference signs | |
|---|---|
| 1 | Production system |
| 2 | Conveying section |
| 3 | Guide structure |
| 4 | Workpiece carrier |
| 5 | Displacement direction |
| 6 | Workpiece |
| 7 | Workpiece carrier top side |
| 8 | Catch element |
| 9 | Drive unit |
| 10 | Workpiece carrier underside |
| 11 | Detection means |
| 12 | Processing station |
| 13 | Workpiece carrier body |
| 14 | Guide device |
| 15 | Guide roller |
| 16 | Workpiece receptacle |
| 17 | First symmetry plane |
| 18 | Second symmetry plane |
| 19 | Gearing |
| 20 | Code element |
| 21 | Code plate |
| 22 | Fastener |
| 23 | Longitudinal orientation |
| 24 | Opening |
| 25 | Detection range |
| 26 | First length |
| 27 | Second length |
| 28 | Third length |
| 29 | Thickness |
| 30 | Control unit |
| 31 | First code plate |
| 32 | Second code plate |
| 33 | Central axis |
| 34 | Code plate top side |
| 35 | Code plate underside |
| 36 | First orientation direction |
| 37 | Second orientation direction |
| 38 | Third orientation direction |
| 39 | Fourth orientation direction |
| 40 | Server |
| 41 | Groove |
| 42 | Inner clearance hole |
| 43 | Outer clearance hole |
| 44 | Distance a |
| 45 | Distance b |
| 46 | Filling material |

The invention claimed is:

1. A workpiece carrier for a production unit, the workpiece carrier comprising:
   (a) a workpiece carrier body;
   (b) a workpiece receptacle arranged on the workpiece carrier body;
   (c) a guide device arranged on the workpiece carrier body that is configured to displace the workpiece carrier body in the production unit; and
   (d) at least four code elements arranged on the workpiece carrier body, each said code element being configured to be identified by a detector arranged in the production unit;
   wherein each of the code elements has inhomogeneous material properties in a longitudinal orientation for identification of the respective code element;
   wherein the code elements are configured so that during a relative movement of the code elements in the longitudinal orientation relative to the detector, the inhomogeneous material properties are detected by the detector to identify the workpiece carrier body; and
   wherein the at least four code elements are arranged on the workpiece carrier body so that the longitudinal orientation of the workpiece carrier body is determinable.

2. The workpiece carrier according to claim 1, wherein the code element is formed of a metallic material.

3. The workpiece carrier according to claim 1, wherein the openings are filled in by a filling material.

4. The workpiece carrier according to claim 1, wherein the code elements that are arranged on the workpiece carrier body comprise eight code elements in the form of code plates, wherein all code plates are identical in design.

5. The workpiece carrier according to claim 1, wherein the code elements are arranged on an underside of the workpiece carrier body.

6. A production unit comprising:
   (a) at least one conveying section comprising a guide structure;
   (b) a detector; and
   (c) at least one workpiece carrier comprising a workpiece carrier body, a workpiece receptacle arranged on the workpiece carrier body, a guide device arranged on the workpiece carrier body that is configured to displace the workpiece carrier in the production unit, the guide device being inserted into the guide structure of the conveying section, and at least four code elements arranged on the workpiece carrier body, each said code element being configured to be identified by the detector;

wherein each of the code elements has inhomogeneous material properties in a longitudinal orientation for identification of the respective code element;

wherein the code elements are configured so that during a relative movement of the code elements in the longitudinal direction relative to the detector, the inhomogeneous material properties are detected by the detector to identify the workpiece carrier; and wherein the at least four code elements allow the orientation of the workpiece carrier body to be determined.

7. The production unit according to claim 6, wherein the detector is an inductive proximity sensor.

8. A method for identification of a workpiece carrier in a production unit, the production unit comprising at least one conveying section having a guide structure, and at least one detector for identifying at least four code elements on the workpiece carrier, wherein the method comprises the following process steps:

moving the workpiece carrier in the conveying section, wherein the at least four code elements are designed for the detector to identify the workpiece carrier, the detector detecting inhomogeneous material properties of the code elements in a longitudinal orientation, wherein the inhomogeneous material properties are formed by openings in the code elements and wherein the at least four code elements allow the orientation of the workpiece carrier body to be determined;

passing the workpiece carrier by the, wherein during the passing of the workpiece carrier, the inhomogeneous material properties of the code elements are detected by the detector based on the movement of at least one of the code elements relative to the detector; and analyzing a signal output by the detector to determine the identity of the workpiece carrier.

9. The method according to claim 8, wherein the detector is an inductive proximity sensor and the code element is formed of a metallic material, the code element having openings constituting the inhomogeneous material properties, wherein when the workpiece carrier passes by the the detector detects these openings.

10. The method according to claim 9, wherein the code elements are differentiated by a different position and size of the openings to clearly identify the workpiece carrier.

11. The method according to claim 9, further comprising detecting distances from rising flank to rising flank and/or from falling flank to falling flank of the code elements.

12. The method according to claim 8, wherein the code elements comprise eight code elements in the form of code plates; wherein when the workpiece carrier passes the detector, at least two code plates of the eight code plates are always detected, and the orientation of the workpiece carrier is determined based on the orientation of the at least two code plates.

13. The method according to claim 8, wherein, based on the identification of the workpiece carrier, the relevant data of the identified workpiece carrier is downloaded by a server via a network.

14. The method according to claim 8, further comprising a control unit for determining the speed of a workpiece carrier as the workpiece carrier passes the detector; wherein, based on a timing of the incoming signal from the detector, the geometric configuration of the code element is determined and the workpiece is identified.

15. The method according to claim 8, wherein the detector detects the current position of the workpiece carrier.

* * * * *